Patented Jan. 19, 1932

1,841,966

UNITED STATES PATENT OFFICE

MAX ALBERT KUNZ, OF MANNHEIM, AND KARL KÖBERLE, OF LUDWIGSHAFEN-ON-THE-RHINE, GERMANY, ASSIGNORS TO GENERAL ANILINE WORKS, INC., OF NEW YORK, N. Y., A CORPORATION OF DELAWARE

PRODUCTION OF VAT DYESTUFFS

No Drawing. Original application filed June 16, 1927, Serial No. 199,420, and in Germany July 8, 1926. Divided and this application filed July 28, 1928. Serial No. 296,085.

The subject matter of the present application has been divided out from our copending application for the manufacture of vat dyestuffs, Ser. No. 199,420, filed June 16, 1927, and relates to the manufacture of vat dyestuffs which are considered to be halogenated allo-ms-naphthodianthrones.

We have found that new halogeniferous vat dyestuffs are obtained when halogen is introduced into the allo-ms-naphthodianthrones which may be obtained by subjecting a 2.2'-dimethyl-ms-benzdianthrone to the action of agents with an alkaline reaction and which we regard to be compounds containing the system.

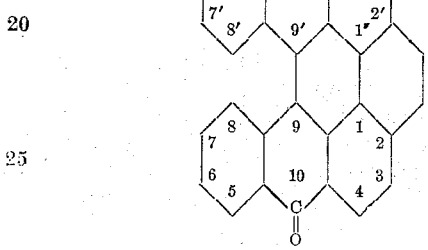

The new dyestuffs are distinguished from the allo-ms-naphthodianthrones which are free from halogen by their deeper color which mostly is substantially more reddish, and by their excellent affinity. Moreover, these new products are of great interest not only as vat dyestuffs, but also as intermediate products for the manufacture of other vat dyestuffs.

The introduction of halogen may be effected in various ways. For example, halogen, or agents liberating the same, may be allowed to act on the dyestuffs in the presence or absence of catalysts. Suitable catalysts for this purpose are, for example, iodine, sulfur, metals and metallic salts. The reaction is preferably carried on in solvents or diluents.

For purification, the afore-described halogenated allo-ms-naphthodianthrones may be recrystallized from solvents of high boiling point, or may be treated, in paste form, with hypochlorite. They usually give green solutions in concentrated sulfuric acid and furnish, with an alkaline hydrosulfite solution, blue-violet vats from which orange to scarlet dyeings are obtained on cotton.

We have also found that the properties of the halogeniferous vat dyestuffs can be substantially improved by introducing several different halogens into the allo-ms-naphthodianthrones. This is effected by treating the said anthrone derivatives with different halogens either concurrently or successively, for example, with chlorine and bromine, or suitable agents which liberate halogens, and preferably in the presence of solvents or diluents and in presence or absence of halogen-transferrers. The introduction of different halogens into the allo-ms-naphthodianthrones may also be effected by introducing into such halogen-allo-ms-naphthodianthrones which are still capable of taking up more halogen, another halogen, which differs from that already contained in the original substance, the said introduction being carried out in the manner already described. This process furnishes excellent yields. The resulting dyestuffs give brilliant scarlet to red dyeings on cotton from a blue-violet vat. For example the dichlor-dibrom-allo-ms-naphthodianthrone prepared by this process dyes cotton a considerably faster and deeper red than is obtained from tetrabrom-allo-ms-naphthodianthrone. Apart from the valuable shade, the resulting dyestuffs also display, in many cases, surprisingly improved properties as regards fastness.

The following examples will further explain the nature of the invention which how-

Example 1

1 part of allo-ms-naphthodianthrone obtainable according to Example 1 of our copending application Ser. No. 199,420 is dissolved in 10 to 12 parts of nitrobenzene, whereupon 0.1 part of iodine is added and 1½ parts of sulfuryl chlorid are stirred in, drop by drop, at 60° C. Stirring is continued for a further 6 hours whereupon the mass is allowed to cool and the dichlor-allo-ms-naphthodianthrone separated in crystalline form is filtered off by suction. It dissolves to a green solution in concentrated sulfuric acid, and can be recovered therefrom, as an orange paste, by precipitation with water. It gives orange dyeings on cotton from a violet vat.

Example 2

A current of dry chlorine is passed for an hour through a boiling solution of 1 part of allo-ms-naphthodianthrone in 10 parts of trichlorbenzene to which 0.1 part of iodine has been added. The solvent is then expelled with steam, and the residue is preferably dissolved in concentrated sulfuric acid and precipitated therefrom by dilution. The resulting product has the same properties as that obtained in Example 1.

Example 3

1 part of allo-ms-naphthodianthrone is dissolved in 10 parts of nitrobenzene, whereupon 1 part of bromine is added and the mixture gradually heated, while stirring, to 150° C. After stirring for 4 hours at this temperature, the mixture is allowed to cool, and the deposited brownish-red crystals are filtered by suction. The resulting dyestuff which is a dibrom-allo-ms-naphthodianthrone may be recrystallized from nitrobenzene and then forms brick-red needles, which dissolve to an emerald green solution in concentrated sulfuric acid. Very strong and clear scarlet dyeings are obtained on cotton from a violet vat.

Example 4

1 part of dichlor-allo-ms-naphthodianthrone obtainable according to Example 4 of our copending application Ser. No. 199,420 is dissolved in 10 to 12 parts of nitrobenzene, 3 parts of bromine being then stirred in, drop by drop, at 160° C., this temperature being maintained for 4 hours and the dyestuff filtered by suction when cold. It gives violet red dyeings on cotton from a violet vat.

Example 5

1 part of allo-ms-naphthodianthrone is dissolved in 10 parts of nitrobenzene, 0.05 part of iron filings being then added. The temperature is raised to 160° C. and 2 parts of bromine are added by drops. After stirring for 4 hours at the same temperature, the mixture is treated as in Example 3. The resulting dyestuff which is a tetrabrom-allo-ms-naphthodianthrone gives brilliant red dyeings on cotton from a violet vat.

Example 6

10 parts of chlor-allo-ms-naphthodianthrone (the dyestuff of Example 1) are dissolved in 100 parts of nitrobenzene and after addition of 1 part of iron filings are stirred with 10 parts of bromine at 160° C., the stirring being continued at the same temperature until the evolution of hydrogen bromide ceases in about 6 to 8 hours. The dyestuff, which is filtered after cooling, and according to analysis is a dichlor-dibrom derivative, forms a brown-red powder which dissolves to a green solution in concentrated sulfuric acid. Brilliant red dyeings are obtained from a bluish-violet vat.

What we claim is:—

1. The process of producing new vat dyestuffs which comprises subjecting a dyestuff containing the system

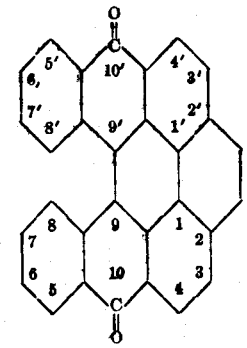

(an allo-ms-naphthodianthrone) to the action of a halogenating agent.

2. The process of producing new vat dyestuffs which comprises subjecting an allo-ms-naphthodianthrone in a diluting medium and in the presence of a halogen transferrer to the action of a halogenating agent.

3. The process of producing new vat dyestuffs which comprises subjecting an allo-ms-naphthodianthrone to the action of agents introducing different halogen atoms into the dyestuff molecule.

4. The process of producing new vat dyestuffs which comprises subjecting a halogen-allo-ms-naphthodianthrone capable of being further halogenated, to the action of a halogenating agent, the halogen of which is different from that contained in the dyestuff.

5. As new articles of manufacture, vat dyestuffs which are halogenated allo-ms-naphthodianthrones which give violet vats and green solutions in concentrated sulfuric acid.

6. As new articles of manufacture vat dyestuffs which are allo-ms-naphthodianthrones containing at least two different halogen atoms which give green solutions in concentrated sulfuric acid and bluish-violet vats.

7. As new articles of manufacture vat dyestuffs which are allo-ms-naphthodianthrones containing chlorine and bromine which give green solutions in concentrated sulfuric acid and bluish-violet vats.

8. As new articles of manufacture dichlor-dibrom-allo-ms-naphthodianthrones dissolving to green solutions in concentrated sulfuric acid and giving a bluish-violet vat.

In testimony whereof, we affix our signatures.

MAX ALBERT KUNZ.
KARL KÖBERLE.